(12) United States Patent
Enochs et al.

(10) Patent No.: US 12,175,647 B1
(45) Date of Patent: Dec. 24, 2024

(54) ADVANCED LENS SYSTEM FOR ASSESSING PROPERTY DAMAGE

(71) Applicant: United Services Automobile Association (USAA), San Antonio, TX (US)

(72) Inventors: Andrew Luke Enochs, San Antonio, TX (US); Matthew Conrad Dahlman, Selma, TX (US); Shawn D. Low, San Antonio, TX (US); Daniel Diaz, San Antonio, TX (US); Breanna Nicole Allerkamp, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 81 days.

(21) Appl. No.: 17/443,724

(22) Filed: Jul. 27, 2021

Related U.S. Application Data

(60) Provisional application No. 63/057,618, filed on Jul. 28, 2020.

(51) Int. Cl.
| | | |
|---|---|---|
| *G01N 25/72* | (2006.01) | |
| *G02B 27/01* | (2006.01) | |
| *G02C 7/04* | (2006.01) | |
| *G06T 7/00* | (2017.01) | |

(52) U.S. Cl.
CPC .......... *G06T 7/0002* (2013.01); *G01N 25/72* (2013.01); *G02B 27/0172* (2013.01); *G02C 7/04* (2013.01); *G02B 2027/0138* (2013.01); *G06T 2207/10048* (2013.01); *G06T 2207/20081* (2013.01); *G06T 2207/30252* (2013.01)

(58) Field of Classification Search
USPC ......................................................... 348/148
See application file for complete search history.

(56) References Cited

U.S. PATENT DOCUMENTS

| | | | |
|---|---|---|---|
| 10,949,814 B1* | 3/2021 | Nelson | G06Q 10/20 |
| 2010/0169420 A1* | 7/2010 | McCoy | H04L 12/2825 |
| | | | 709/204 |
| 2012/0297337 A1* | 11/2012 | St. Denis | G06Q 30/0613 |
| | | | 705/305 |
| 2016/0253779 A1* | 9/2016 | Park | G06V 30/412 |
| | | | 382/264 |
| 2020/0117336 A1* | 4/2020 | Mani | F25B 49/005 |

\* cited by examiner

*Primary Examiner* — Mikhail Itskovich
(74) *Attorney, Agent, or Firm* — Fletcher Yoder P.C.

(57) ABSTRACT

An advanced lens system includes an advanced lens configured to be worn by an individual. The advanced lens system includes a camera configured to obtain one or more images of a property. The advanced lens system includes one or more processors communicatively coupled to the advanced lens and the camera, the one or more processors being configured to receive the one or more images of the property and process the one or more images to identify primary damage to the property. The one or more processors are also configured to predict, based on the primary damage and previous damage data stored in a database, secondary damage that is likely to be present with the primary damage. The one or more processors are further configured to provide an output indicative of the secondary damage that is likely to be present with the primary damage via a display of the advanced lens.

18 Claims, 3 Drawing Sheets

ADVANCED LENS SYSTEM FOR ASSESSING PROPERTY DAMAGE

CROSS-REFERENCE TO RELATED APPLICATION

This application claims priority to and the benefit of U.S. Provisional Application No. 63/057,618, entitled "ADVANCED LENS SYSTEM FOR ASSESSING PROPERTY DAMAGE," filed Jul. 28, 2020, which is hereby incorporated by reference in its entirety for all purposes.

BACKGROUND

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Property damage to a property may occur due to natural disasters (e.g., hurricanes, floods), accidents (e.g., electrical fire, vehicle crash), wear over time (e.g., settling of a foundation), or any of a variety of other events. Detection and/or assessment of the property damage is generally performed through an in-person, physical inspection of the property. For example, an individual may inspect damage to a vehicle in order to assess the damage to the vehicle and to estimate a cost to repair the damage to the vehicle.

SUMMARY

Certain embodiments commensurate in scope with the present disclosure are summarized below. These embodiments are not intended to limit the scope of the disclosure, but rather these embodiments are intended only to provide a brief summary of possible forms of present embodiments. Indeed, present embodiments may encompass a variety of forms that may be similar to or different from the embodiments set forth below.

In an embodiment, an advanced lens system includes an advanced lens configured to be worn by an individual. The advanced lens system includes a camera configured to obtain one or more images of a property. The advanced lens system includes one or more processors communicatively coupled to the advanced lens and the camera, the one or more processors being configured to receive the one or more images of the property and process the one or more images to identify primary damage to the property. The one or more processors are also configured to predict, based on the primary damage and previous damage data stored in a database, secondary damage that is likely to be present with the primary damage. The one or more processors are further configured to provide an output indicative of the secondary damage that is likely to be present with the primary damage via a display of the advanced lens.

In an embodiment, an advanced lens system includes one or more processors that are configured to receive an input indicative of primary damage to the property. The one or more processors are also configured to predict, based on the primary damage and previous damage data stored in a database, multiple types of secondary damage likely to be present with the primary damage. The one or more processors are also configured to prioritize the multiple types of secondary damage based on a respective severity of damage value, a respective estimated repair cost, a respective proximity to an advanced lens worn by an individual, or any combination thereof. The one or more processors are further configured to provide an output indicative of a highest priority type of secondary damage of the multiple types of secondary damage that is likely to be present with the primary damage via a display of the advanced lens configured to be worn by the individual.

In an embodiment, a method of operating an advanced lens system includes receiving, at one or more processors, one or more images of a property. The method also includes processing, using the one or more processors, the one or more images to identify primary damage to the property. The method also includes accessing, using the one or more processors, previous damage data stored in a database. The method also includes predicting, using the one or more processors, secondary damage that is likely to be present with the primary damage based on the primary damage and the previous damage data. The method further includes instructing, using the one or more processors, a display of an advanced lens worn by an individual to provide an output indicative of the secondary damage that is likely to be present with the primary damage.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
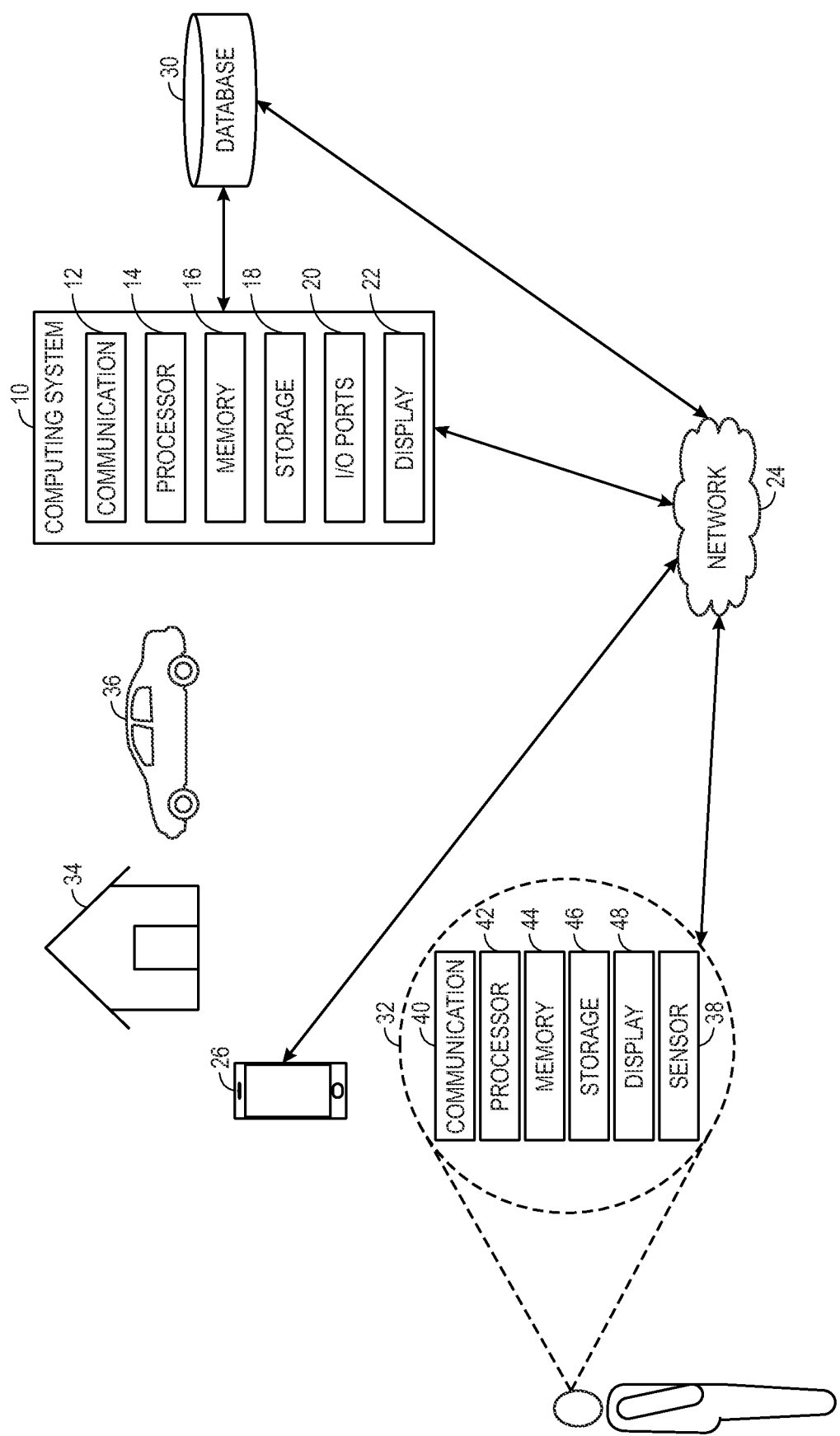
FIG. 1 illustrates a schematic diagram of an advanced lens system that is configured to assess damage to a property, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As noted above, detection of property damage is generally performed through an in-person, physical inspection of a property. It is presently recognized that it would be beneficial to provide an individual (e.g., insurance adjuster, property owner) with an advanced lens system that enhances an ability of the individual to visualize damage to the property (e.g., by providing greater than 20/20 vision to the individual) and/or that operates to detect damage to the property (e.g., via one or more sensors, such as an imaging sensor or camera). In some embodiments, the advanced lens may be a permanent lens, such as an intraocular bionic lens that is surgically placed in an eye of the individual. In some embodiments, the advanced lens may be a removable lens, such as a contact lens that is worn on the eye of the individual (e.g., temporarily or permanently; worn in contact with the eye) or an eyeglasses lens that is integrated into eyeglasses worn by the individual.

The advanced lens system may facilitate inspection and assessment of damage to the property. In particular, the advanced lens system may predict secondary damage (e.g., hidden damage; not yet visualized by the individual or detected by the advanced lens; not visible to the individual or detectable by the advanced lens without the individual contacting or modifying the property, such as by lifting a hood of a vehicle) to the property. For example, in operation, property data (e.g., indicative of characteristics of a property, such as property type, property location, property materials, and/or property make and model) and primary damage data (e.g., visualized by the individual using the advanced lens and/or detected via the advanced lens) may be input into a computing system of the advanced lens system. The computing system may access previous damage data from one or more databases and then predict the secondary damage that is likely to be present in the property based on the property data, the primary damage data, and the previous damage data. Further, the computing system may identify object types (e.g., a make and model of a vehicle) and provide relevant guidance (e.g., identify a location of a car battery within a particular vehicle type) based on the object types. The computing system may instruct output of an indication of the predicted secondary damage, such as via a respective display of the advanced lens and/or via a respective display of a personal device of the individual, for visualization by the individual. By predicting and displaying the indication of the predicted secondary damage in this way, the advanced lens system may enable efficient and thorough inspection of damage to the property by the individual and/or facilitate appropriate repairs to the property.

With the foregoing in mind, FIG. 1 is a block diagram of an advanced lens system 8 (e.g., property damage detection system; secondary damage prediction system) having a computing system 10. The computing system 10 may include any suitable computer device, such as a general-purpose personal computer, a laptop computer, a tablet computer, a mobile computer, or the like that is configured in accordance with present embodiments. The computing system 10 may include various types of components that assist the computing system 10 in performing various operations described herein. For example, the computing system 10 may include a communication component 12, a processor 14, a memory 16, a storage 18, input/output (I/O) ports 20, and/or a display 22. The communication component 12 may facilitate wired or wireless communication between the computing system 10, data sources, and various other computing systems via a network 24. The processor 14 may be any type of computer processor or microprocessor capable of executing computer-executable code. The processor 14 may also include multiple processors that may perform the various operations described herein.

The memory 16 and the storage 18 may be any suitable articles of manufacture that can serve as media to store processor-executable code, data, or the like. These articles of manufacture may represent computer-readable media (e.g., any suitable form of memory or storage) that may store the processor-executable code used by the processor 14 to perform various techniques disclosed herein. The memory 16 and the storage 18 may represent non-transitory computer-readable media (e.g., any suitable form of memory or storage). It should be noted that non-transitory merely indicates that the media is tangible and not a signal.

The I/O ports 20 may be interfaces that may couple to other peripheral components, such as input devices (e.g., keyboard, mouse). The display 22 may operate as a human machine interface (HMI) to depict visualizations associated with software or executable code being processed by the processor 14. In one embodiment, the display 22 may be a touch display capable of receiving inputs from a user of the computing system 10. The display 22 may be any suitable type of display, such as a liquid crystal display (LCD), plasma display, or an organic light emitting diode (OLED) display, for example. It should be noted that the components described above with regard to the computing system 10 are examples and the computing system 10 may include additional or fewer components.

As shown, the network 24 may be communicatively coupled to a mobile device 26 (e.g., mobile phone; carried by the individual) and/or one or more databases 30, which may store previous damage data for multiple properties and data regarding object types (e.g., identification data and guidance data for object types). In some embodiments, the one or more databases 30 may organize or categorize the previous damage data based on characteristics of the property (e.g., property type, property location, property materials, and/or property make and model) and/or characteristics of the primary damage (e.g., damage type, such as scratches, dents, or fire damage; size or extent of the damage; location on the property) to the property. It should be appreciated that the one or more databases 30 may be accessible to the computing system 10 via the network 24 or may be part of the computing system 10 (e.g., within the storage 18).

As shown, the advanced lens system 8 may include an advanced lens 32 (or lenses) that may be used to visualize and/or to detect damage to the property, which may be a home 34, a vehicle 36, or any other suitable property. In some embodiments, the advanced lens 32 may be a permanent lens, such as an intraocular bionic lens that is surgically placed in an eye of an individual. In some embodiments, the advanced lens 32 may be a removable lens, such as a contact lens that is temporarily worn on the eye of the individual or an eyeglasses lens that is integrated into eyeglasses worn by the individual.

In some embodiments, the advanced lens 32 may include or be coupled to one or more sensors 38, which may include an image sensor or camera that is configured to obtain images of the property. In some embodiments, the one or more sensors 38 may include an infrared sensor that operates to detect regions of varying thermal properties. Thus, the advanced lens 32 may be a permanent implanted lens, a contact lens, or an eyeglasses lens. Regardless of its form (e.g., regardless of whether it is the permanent implanted lens, the contact lens, or the eyeglasses lens), the advanced lens 32 may be a "smart" lens having the one or more sensors 38, a communication device 40, a processor 42, a memory 44, a storage 46, and/or a display 48, or the advanced lens 32 may be a "non-smart" lens that is devoid of such components and that merely enhances the ability of the individual to visualize damage to the property (e.g., by providing greater than 20/20 vision). In some cases, the advanced lens 32 may include some of all of the one or more sensors 38, a communication device 40, a processor 42, a memory 44, a storage 46, and/or a display 48 in combination with enhancing the ability of the individual to visualize damage to the property (e.g., by providing greater than 20/20 vision). The advanced lens 32 may have other forms, such as the intraocular bionic lens and/or the contact lens with certain components (e.g., the communication device 40 and the display 48) that are wirelessly communicatively coupled to other components (e.g., the processor 42, the memory 44, the storage 46, and the sensor 38) that are separate from the advanced lens 32, such as coupled to separate glasses or head-mounted gear worn by the individual.

In operation, where the advanced lens 32 is a "non-smart" lens, the individual may visualize the damage to the property through the advanced lens 32. For example, the advanced lens 32 may enable the individual to observe damage, such as fine cracks, that may not be observable by an un-aided human eye/without the advanced lens 32 at any distance or from a certain distance. In some such cases, the individual may then use the mobile device 26 to provide inputs related to the property and the primary damage, wherein the inputs may include characteristics of the property and characteristics of the primary damage. In some embodiments, the mobile device 26 (e.g., via an application or via instructions from the computing system 10) may provide prompts or instructions to the individual to facilitate the visualization of and the inputs related to the primary damage.

The inputs may be sent from the mobile device 26 to the computing system 10 (e.g., via the network 24). In some embodiments, if the computing system 10 determines that one or more additional inputs related to the property data and/or the primary damage would be useful in completing an assessment of the damage (e.g., for secondary damage predictions), the computing system 10 may instruct the mobile device 26 to provide prompts to the individual to obtain the property data, to look for additional primary damage, to look for secondary damage that may be hidden from view, and/or to look at certain locations of the property (e.g., to look for cracks in tubing under a hood of the vehicle; to look for damage to a roof of the home). Then, the individual may provide additional inputs in response to the prompts. The computing system 10 may use the inputs to assess the primary damage and to make secondary damage predictions for the property, as discussed in greater detail herein.

In operation, where the advanced lens 32 is a "smart" lens, the advanced lens 32 may be configured to detect at least some of the property data and/or the primary damage to the property. For example, the advanced lens 32 may include or be communicatively coupled to the one or more sensors 38 that include an image sensor or camera that is configured to detect (e.g., obtain images of) the property. The images obtained by the camera may be provided to the computing system 10 via the network 24. The computing system 10 may process the images (e.g., via template matching or other image processing techniques) to determine the property data and/or the primary damage data. In such cases, the primary damage data may include a type of the damage (e.g., scratch, dent, missing part, flood damage, fire damage), an extent or size of the primary damage (e.g., height, length, width, volume, rooms impacted), a location of the primary damage, and/or other characteristics of the primary damage. It should be appreciated that the individual may provide at least some of the inputs related to the property data and/or the primary damage via the mobile device 26 and/or the computing system 10 may utilize certain information obtained via the mobile device 26 and/or the advanced lens 32 to look up at least some of the property data in the one or more databases 30. The mobile device 26 and/or the advanced lens 32 (e.g., via instructions from the computing system 10) may provide prompts to the individual to provide the property data, to look for additional primary damage, to look for secondary damage that may be hidden from view, and/or to look at certain locations of the property (e.g., to look for cracks in tubing under a hood of the vehicle; to look for damage to a roof of the home).

As an example, the camera associated with the advanced lens 32 may obtain the images of a vehicle, including fine cracks along a bumper of the vehicle. The computing system 10 may process the images to determine a make and model of the vehicle (e.g., the property data) and to categorize the primary data (e.g., the type of damage, which is the cracks; the size of the damage, such as dimensions of the cracks; and a location of the damage, which is along the bumper). In some embodiments, the computing system 10 may process the images via keyword searching (e.g., such as when a model name printed on the vehicle or a license plate number is captured in the images), via template matching (e.g., such as by matching a shape of the vehicle to a template stored in the one or more databases 30; such as by matching the primary damage to a template stored in the one or more databases 30), and/or via any other suitable image processing techniques.

Using the property data and/or the primary damage data, the computing system 10 may search the one or more databases 30 to identify previous damage data associated with the same property, with properties that have similar property data, and/or with similar primary damage data. With reference to the example above, the computing system 10 may identify previous damage data associated with similar properties (e.g., the same make and model of the vehicle) that had similar primary damage data (e.g., fine cracks along the bumper). The previous damage data may also include corresponding secondary damage data (e.g., the secondary damage that occurred along with the primary damage). The computing system 10 may then determine that such secondary damage is likely to be present in the property (e.g., the property that is currently being assessed or inspected).

The computing system 10 may further process the property data, the primary damage data, and the previous damage data to determine and/or to predict a likelihood (e.g., percent likelihood) that the secondary damage is present in the property. For example, if secondary damage to an engine has accompanied similar fine cracks in the bumpers of similar vehicles in 95 percent of previous instances (e.g., relevant sets of previous damage data), then the computing system 10 may determine that the engine has a 95 percent chance of being damaged in the vehicle. Algorithms for determining the likelihood that the secondary damage is present in the property may take into account any of a variety of factors and may adjust for location and weather conditions at the property, age of the property, construction features of the property (e.g., materials, make, model), prior damage to the property, and/or characteristics of the primary damage, for example. If a sufficient likelihood of the secondary damage is identified (e.g., greater than a threshold percentage chance), present embodiments may guide a user to observe an area associated with the potential secondary damage. Specifically, this may include guidance for accessing the area associated with the potential secondary damage (e.g., guidance for accessing/observing a particular structural support of a car based on a bumper of the car being deformed). Because an object type may be identified by present embodiments, specific guidance for the particular object type may be provided (e.g., unique to the particular object type; specific instructions for accessing a filter for a fuel system of a particular vehicle type).

In response to predicting the secondary damage, the computing system 10 may instruct display of an indication of the predicted secondary damage to the individual via the mobile device 26 and/or via the display 48 of the advanced lens 32. For example, the computing system 10 may instruct display of the indication of a type of the predicted secondary damage (e.g., burst fluid conduit, moisture damage behind a wall, bent frame), an extent or size of the predicted secondary damage (e.g., dimensions), a location of the predicted secondary damage, and/or other characteristics of the predicted secondary damage. The indication of the predicted secondary damage may only be provided in response to the likelihood that the secondary damage is present being greater than a threshold (e.g., greater than 25, 50, 75, 90, or 95 percent). Where more than one instance or type of predicted secondary damage is likely to have occurred, the computing system 10 may determine an order in which to present the indications of the predicted secondary damage. For example, the indications may be provided in order from most likely secondary damage to least likely secondary damage, the indications may be provided in order from most severe secondary damage to least severe secondary damage, the indications may be provided in order from secondary damage that is most expensive to repair to secondary damage that is least expensive to repair (e.g., based on cost data, which may be accessed from the one or more databases 30), the indications may be provided in order from secondary damage that has a location nearest the individual to secondary damage that has a location farthest from the individual (e.g., as determined based on the images obtained by the camera of the advanced lens 32, and/or based on data from a position sensor, such as a global positioning sensor of the mobile device 26 and/or the advanced lens 32, and/or based on a map of the property), or in any other suitable manner. In some embodiments, the indications may be updated as the individual moves relative to the property (e.g., as the individual approaches a portion of the property and changes their proximity to the secondary damage/changes the nearest secondary damage). Prioritizing and displaying the indications in this way may be advantageous because the display 48 of the advanced lens 32 may be relatively small, and displaying a limited number of indications (e.g., one or more) at one time may allow the individual to see the indications more clearly.

The computing system 10 may instruct display of a prompt to the individual to look for and/or move toward the predicted secondary damage, which may enable the camera associated with the advanced lens 32 to obtain images at the location of the predicted secondary damage. Then, the computing system 10 may process the images to confirm the presence (or absence) of the predicted secondary damage, as well as to identify the characteristics of the predicted secondary damage. The computing system 10 may instruct display of a notification to the individual via the mobile device 26 and/or via the display 48 of the advanced lens 32 upon confirmation of the presence (or absence) of the predicted secondary damage. For example, the notification may be a text message or symbol that indicates that the predicted secondary damage was successfully detected and assessed by the advanced lens system 8. However, in some cases, the predicted secondary damage may not be capable of being visualized by the individual without breaking or dismantling the property. Thus, the predicted secondary damage may instead be confirmed during a repair process, such as when the vehicle is taken to a repair shop to repair the damage. Regardless of how the predicted secondary damage is identified and confirmed, the property data, the primary damage data, and the secondary damage may be utilized to update the one or more databases 30. In this way, the one or more databases 30 may be updated upon each event (e.g., upon each event of primary damage inspected using the advanced lens 32).

In some embodiments, the one or more sensors 38 may include an infrared sensor that is configured to detect regions of varying thermal properties. For example, the infrared sensor may detect fluid conduits that contain heated or cooled fluid behind a wall of the home or under a hood of the vehicle. The infrared sensor may detect the regions of varying thermal properties, and then the processor 42 may instruct display of an indication (e.g., heat map) of the varying thermal regions on the display 48 for visualization by the individual. In some embodiments, data from the infrared sensor may be provided to the computing system 10, which may then instruct display of the indication of the varying thermal regions on the display 22 and/or on the mobile device 26.

In some embodiments, the computing system 10 may process the inputs (e.g., the property data, the primary damage data, the thermal data), use the inputs to select relevant previous damage data, and then predict the secondary damage. For example, the previous damage data may indicate that fire damage to a wall of a home negatively impacts and results in secondary damage to fluid conduits that are within 1 meter of the fire. Thus, if the property data, the primary damage data, and the thermal data indicate that the fluid conduits are within 1 meter of the fire damage, the computing system 10 will predict that this type of secondary damage is present at the home.

In certain embodiments, machine learning may be used to predict the secondary damage that is likely to be present with the primary damage. As used herein, machine learning refers to algorithms and statistical models that may be used to perform a specific task without using explicit instructions, relying instead on patterns and inference. In particular, machine learning generates a mathematical model based on data (e.g., sample or training data, previous damage data) in order to make predictions or decisions without being explicitly programmed to perform the task. Thus, as images of the property are collected, patterns of the primary damage may be identified and processed via machine learning to predict the secondary damage.

Figure 2:
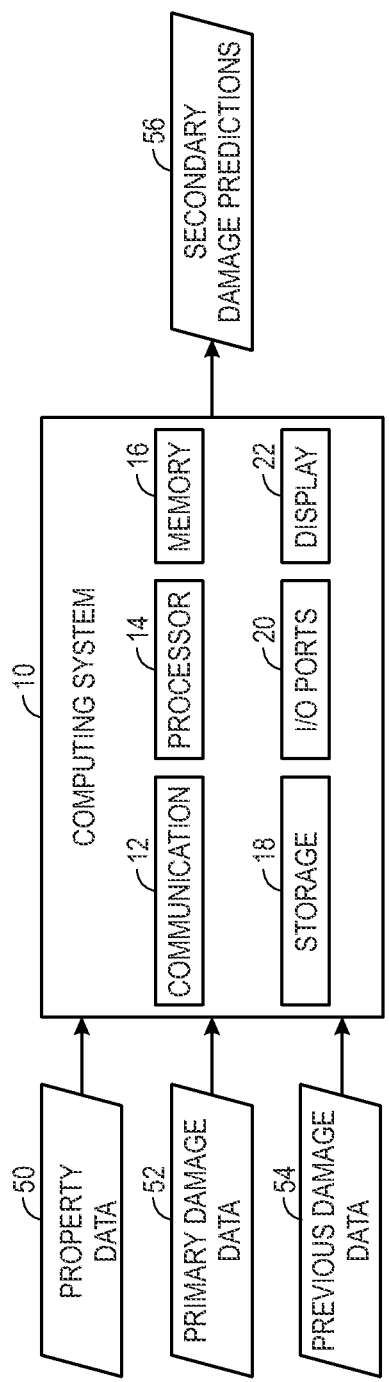
FIG. 2 illustrates a block diagram of a computing system that may be used in the advanced lens system of FIG. 1, wherein the computing system is configured to receive property data and primary damage data and to output secondary damage predictions for the property, in accordance with embodiments described herein.

With the foregoing in mind, FIG. 2 illustrates a block diagram of the computing system 10 that may be used to predict the secondary damage to the property. As previously discussed, the computing system 10 may receive property data 50 and/or primary damage data 52 via the network. The property data 50 and/or primary damage data 52 may be input by the individual wearing the advanced lens of FIG. 1 or by the advanced lens of FIG. 1 (or related system components).

In some embodiments, the computing system 10 may receive or access previous damage data 54, such as from the one or more databases of FIG. 1. The computing system 10 may process the property data 50, the primary damage data 52, and the previous damage data 54 to make secondary damage predictions 56. In particular, the computing system 10 may use the property data 50, the primary damage data 52, and the previous damage data 54 to determine and/or to predict a likelihood (e.g., percent likelihood) that the secondary damage is present in the property.

Figure 3:
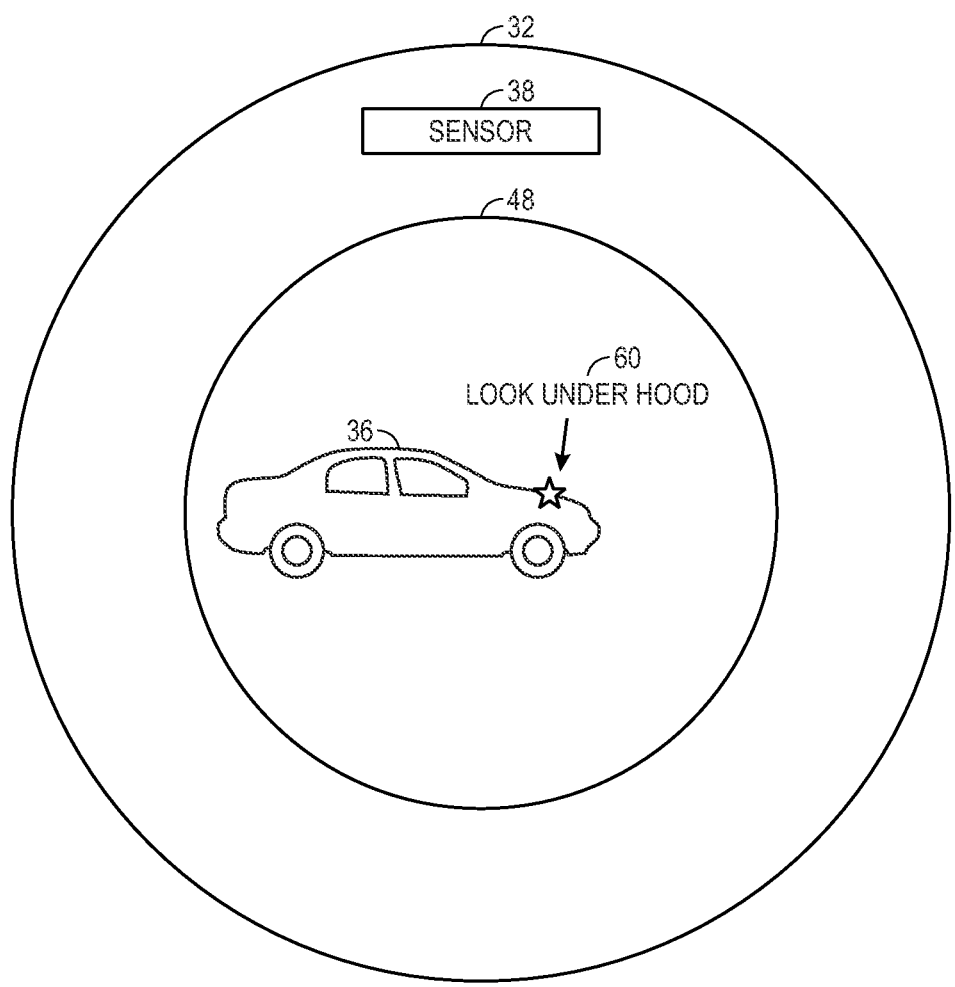
FIG. 3 illustrates a rear view of an advanced lens that may be used in the advanced lens system of FIG. 1, in accordance with embodiments described herein.

FIG. 3 illustrates a rear view of the advanced lens 32. As shown, the advanced lens 32 may be transparent (or at least include a transparent portion) to enable the individual to view a real-world environment (e.g., the property, such as the vehicle 36) through the advanced lens 32. In some embodiments, the display 48 may be a transparent display that is positioned to enable the individual to view the real-world environment through the display 48.

Regardless of the position of the display 48 relative to the advanced lens 32, the display 48 may present information (e.g., text, images) to the individual. In particular, the display 48 may present information to enable the individual to view the information overlaid onto the real-world environment. In this way, the advanced lens 32 may provide an augmented reality (AR) experience to facilitate efficient and thorough damage assessments. For example, an indication 60 of predicted secondary damage may be automatically presented via the display 48 in response to the individual looking at the primary damage of the property through the advanced lens 32. In this way, the indication 60 of the secondary damage may be presented as an automated alert to notify the individual of the likely presence of the secondary damage without the individual taking any steps other than looking at the primary damage of the property through the advanced lens 32.

The indication 60 may include text information, such as a text description of the predicted secondary damage, an arrow pointing to a location of the predicted secondary damage, and/or a symbol highlighting the location of the predicted secondary damage. The one or more sensors 38, such as the camera, may obtain images of the real-world environment to enable the processing components of the advanced lens 32 to position the indication 60 relative to the property so that the individual can visualize the property and the indication 60 at the same time and/or so that the indication 60 accurately identifies the location of the predicted secondary damage to the individual, for example. Thus, as the individual moves about the property, the indication 60 may also move about the display 48 to provide the indication 60 in this manner.

As noted above, multiple predicted secondary damage incidents may be present. In some embodiments, the indication 60 may update (e.g., switch from a first indication of a first predicted secondary damage to a second indication of a second predicted secondary damage) as the individual moves about the property. For example, the first indication of the first predicted secondary damage may be presented at a first time while the advanced lens 32 is positioned proximate to a first portion the property (e.g., while the first portion of the property is being viewed through the advanced lens 32), and then the second indication of the second predicted secondary damage may be presented at a second time while the advanced lens 32 is positioned proximate to a second portion the property (e.g., while the second portion of the property is being viewed through the advanced lens 32). It should also be appreciated that the indication of thermal data may be presented on the display 48 for visualization by the individual. In some such cases, the indication of thermal data may be presented to overlay the real-world environment so that the individual can visualize the regions of thermal variation relative to the property. It should be appreciated that the display 48 may have any suitable form. For example, in some cases in which the advanced lens 32 is part of the eyeglasses, the display 48 may include a portion of the advanced lens 32 onto which images are projected so that the images can be visualized by the individual.

Advantageously, the disclosed techniques may enable more efficient and accurate inspection of damage to a property. For example, cracks in a vehicle's exterior may be detected and analyzed by present embodiments, which may then provide guidance regarding related damage (e.g., damage to structural features hidden from view) based on data (e.g., historical data) associate with the detected cracks. This may save substantial time, effort and expense associate with not only detecting but also repairing such damage. Moreover, the present embodiments may enable collection and organization of damage data in a database that may be utilized for comparison to a current instance of primary damage to a property in order to predict secondary damage that may be present at the property.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. An advanced lens system, comprising:
   an advanced lens configured to be worn by an individual;
   a camera configured to obtain one or more images of a property; and
   one or more processors communicatively coupled to the advanced lens and the camera, the one or more processors being configured to:
     receive the one or more images of the property;
     process the one or more images to identify primary damage to the property;
     predict, based on the primary damage and previous repair cost data stored in a database, a respective estimated repair cost for each of a plurality of types of secondary damage that is likely to be present with the primary damage, wherein the plurality of types of secondary damage is undetected by the camera such that the plurality of types of secondary damage is not visible in the one or more images of the property;
     determine a priority order in which to present a respective output indicative of each of the plurality of types of secondary damage based on the respective estimated repair cost for each of the plurality of types of secondary damage; and
     provide the respective output indicative of a highest priority of the plurality of types of secondary damage that is likely to be present with the primary damage via a display of the advanced lens to facilitate inspection for an insurance assessment.

2. The advanced lens system of claim 1, wherein the one or more processors are configured to predict a likelihood of the plurality of types of secondary damage being present with the primary damage, and the output is indicative of the likelihood.

3. The advanced lens system of claim 1, comprising an infrared sensor that is configured to detect thermal variations at the property.

4. The advanced lens system of claim 3, wherein the one or more processors are configured to receive thermal data indicative of the thermal variations and to predict the plurality of types of secondary damage that is likely to be present with the primary damage based on the thermal variations.

5. The advanced lens system of claim 4, wherein the one or more processors are configured to provide an additional output indicative of respective locations of the thermal variations via the display of the advanced lens.

6. The advanced lens system of claim 1, wherein the advanced lens comprises the camera that is configured to obtain the one or more images of the property.

7. The advanced lens system of claim 1, wherein the one or more processors are configured to update the database in response to confirmation of the plurality of types of secondary damage being present with the primary damage.

8. The advanced lens system of claim 1, wherein the one or more processors are configured to process the one or more images to identify one or more characteristics of the property.

9. The advanced lens system of claim 8, wherein the one or more processors are configured to predict the plurality of types of secondary damage that is likely to be present with the primary damage based on the one or more characteristics of the property.

10. The advanced lens system of claim 1, wherein the one or more processors are configured to:
search previous damage data to identify previous primary damage similar to the primary damage; and
predict the respective estimated repair cost for each of the plurality of types of secondary damage likely to be present with the primary damage based on the previous repair cost data associated with the previous primary damage similar to the primary damage.

11. An advanced lens system, comprising:
one or more processors configured to:
receive an input indicative of primary damage to a property;
predict, based on the primary damage and previous repair cost data stored in a database, a respective estimated repair cost for each of a plurality of types of secondary damage likely to be present with the primary damage, wherein the secondary damage is hidden from a perspective of the advanced lens system;
determine a priority order in which to present a respective output indicative of each of the plurality of types of secondary damage based on the respective estimated repair cost for each of the plurality of types of secondary damage; and
provide the respective output indicative of a highest priority type of secondary damage of the plurality of types of secondary damage that is likely to be present with the primary damage via a display of the advanced lens configured to be worn by an individual to facilitate inspection for an insurance assessment.

12. The advanced lens system of claim 11, wherein the advanced lens comprises a contact lens that is configured to be positioned on an eye of the individual.

13. The advanced lens system of claim 11, comprising a camera configured to obtain one or more images of the property, wherein the one or more processors are configured to receive the one or more images of the property as the input indicative of the primary damage to the property.

14. The advanced lens system of claim 11, wherein the one or more processors are configured to:
search previous damage data to identify other properties similar to the property; and
predict the respective estimated repair cost for each of the plurality of types of secondary damage likely to be present with the primary damage based on the previous repair cost data associated with the previous damage data similar to the primary damage.

15. A method of operating an advanced lens system to facilitate inspection for an insurance assessment, the method comprising:
receiving, at one or more processors, one or more images of a property;
processing, using the one or more processors, the one or more images to identify primary damage to the property;
accessing, using the one or more processors, previous repair cost data stored in a database;
predicting, using the one or more processors and based on the primary damage and the previous repair cost data, a respective estimated repair cost for each of a plurality of types of secondary damage likely to be present with the primary damage, wherein the plurality of types of secondary damage is not visible in the one or more images of the property;
determining, using the one or more processors, a priority order in which to present a respective output indicative of each of the plurality of types of secondary damage based on the respective estimated repair cost for each of the plurality of types of secondary damage; and
instructing, using the one or more processors, a display of an advanced lens worn by an individual to provide the respective output indicative of a highest priority of the plurality of types of the secondary damage to facilitate the inspection for the insurance assessment.

16. The method of claim 15, wherein the method comprises:
instructing, using the one or more processors and subsequent to instructing the display of the advanced lens worn by the individual to provide the respective output indicative of the highest priority of the plurality of types of the secondary damage, the display of the advanced lens to provide the respective output indicative of a second highest priority of the plurality of types of secondary damage likely to be present with the primary damage.

17. The advanced lens system of claim 1, wherein the one or more processors are configured to predict the respective estimated repair cost for each of the plurality of types of secondary damage and to provide the respective output indicative of the highest priority of the plurality of types of secondary damage without the individual contacting or modifying the property.

18. The advanced lens system of claim 1, wherein the primary damage is located at an exterior of a vehicle and the plurality of types of secondary damage is hidden by the exterior of the vehicle.

* * * * *